US010867499B2

(12) United States Patent
Chen et al.

(10) Patent No.: US 10,867,499 B2
(45) Date of Patent: Dec. 15, 2020

(54) LIGHT SOURCE ASSEMBLY FOR ALARM DEVICE AND FIRE ALARM DEVICE INCLUDING THE SAME

(71) Applicants: Baiyi Lighting (Shanghai) Holdings Limited, Shanghai (CN); Jade Bird Fire Co., Ltd., Beijing (CN)

(72) Inventors: Chen Chen, Beijing (CN); Wenxue Xie, Shanghai (CN); Qirong Xing, Beijing (CN); Lijie Zheng, Beijing (CN); Gaihong Du, Beijing (CN); Hua Hang, Shanghai (CN); Huosheng Wang, Shanghai (CN)

(73) Assignees: Baiyi Lighting (Shanghai) Holdings Limited, Shanghai (CN); Jade Bird Fire Co., Ltd., Beijing (CN)

( * ) Notice: Subject to any disclaimer, the term of this patent is extended or adjusted under 35 U.S.C. 154(b) by 0 days.

(21) Appl. No.: 16/710,721

(22) Filed: Dec. 11, 2019

(65) Prior Publication Data

US 2020/0202694 A1    Jun. 25, 2020

(30) Foreign Application Priority Data

Dec. 19, 2018 (CN) .......................... 2018 1 15577950
Dec. 19, 2018 (CN) .................... 2018 2 21368515 U

(51) Int. Cl.
| G08B 17/10 | (2006.01) |
| H05B 45/18 | (2020.01) |
| F21K 9/60 | (2016.01) |
| F21Y 115/10 | (2016.01) |

(52) U.S. Cl.
CPC ................ *G08B 17/10* (2013.01); *F21K 9/60* (2016.08); *H05B 45/18* (2020.01); *F21Y 2115/10* (2016.08)

(58) Field of Classification Search
CPC ............ G08B 17/10; F21K 9/60; H05B 45/18
USPC ......................................................... 340/506
See application file for complete search history.

(56) References Cited

U.S. PATENT DOCUMENTS

| 8,138,928 B2 * | 3/2012 | Farley ...................... G08B 5/36 340/577 |
| 2007/0132575 A1 * | 6/2007 | Ellul ........................ G08B 5/38 340/524 |
| 2008/0224849 A1 * | 9/2008 | Sirhan ................. F21V 23/0442 340/521 |

(Continued)

*Primary Examiner* — Kerri L McNally
(74) *Attorney, Agent, or Firm* — Meunier Carlin & Curfman LLC

(57) ABSTRACT

The present invention provides a light source assembly applied to an alarm device, which comprises a base; a light source arranged on the base and configured to emit visible light; and a lens arranged on an emission path of the light source and configured to modulate the visible light emitted by the light source into a light distribution curve conforming to the presetting. According to the light source assembly and the alarm device including the same in the embodiment of the present invention, the light emitted by the light source is modulated through the lens, so that the angle of emission of the light source assembly and the alarm device can be fully expanded. Especially when the light source assembly and the alarm device are applied to fire-fighting devices, the alarm reception blind area can be effectively reduced, and the safety level is improved.

19 Claims, 4 Drawing Sheets

(56) References Cited

U.S. PATENT DOCUMENTS

| | | | | |
|---|---|---|---|---|
| 2009/0040065 A1* | 2/2009 | Dalton | ............... | G09F 9/33 |
| | | | | 340/815.45 |
| 2009/0045933 A1* | 2/2009 | Smith | ............... | H05B 45/00 |
| | | | | 340/468 |
| 2009/0096620 A1* | 4/2009 | Kuo | ............... | G08B 17/10 |
| | | | | 340/628 |
| 2012/0299738 A1* | 11/2012 | Sellam | ............... | G08B 17/10 |
| | | | | 340/628 |
| 2019/0072266 A1* | 3/2019 | Pollack | ............... | H05B 45/00 |

\* cited by examiner

LIGHT SOURCE ASSEMBLY FOR ALARM DEVICE AND FIRE ALARM DEVICE INCLUDING THE SAME

RELATED APPLICATION

This application claims priority to, and the benefit of, Chinese Patent Application No. CN2018115577950, filed on Dec. 19, 2018, and CN2018221368515, filed on Dec. 19, 2018, each of which is incorporated by reference herein in its entirety.

TECHNICAL FIELD

The present invention generally relates to the security field, and, more especially, to a light source assembly for an alarm device and a fire alarm device including the same.

BACKGROUND

In the security field, and especially in the field of firefighting alarm, it is required that a timely alarm can be delivered to a nearby crowd in case of danger or fire, and raise the alert of the crowd so as to evacuate them as soon as possible or take other effective measures to avoid danger.

In order to provide alarm for the crowd, acousto-optic alarm is a way customarily adopted. For example, an alarm emits intense light beams, along with particular colors, flicker, rotation and other manner, to remind the crowd of an existing risk. Currently, common alarm ways include, for example, flashtube flicker and the flicker given by LED to replace flashtube. But LED flicker has certain shortcomings. The angle of emission of LEDs is usually at about 20°-45°, and for an LED of heat dissipation, the angle of emission is at 45°-90°, or can reach around 120° (i.e., 60° from the axis of the LED); while beyond the range of emission, the light beam intensity is very low, for example, being 0 or less than 5% of the intensity right in front of the LED. Even by taking 120° as an example, there may be part of the crowd still staying within the blind area of light emitted by the LED, and this part of the crowd will be unlikely to receive the alarm information in a timely manner, so a serious safety hazard exists. Thus, there is a demand for improvement made to current alarm devices.

The contents in the Background just disclose the technologies known to the inventors rather than surely represent the prior art in the field.

SUMMARY

In view of one or more of the defects existing in the prior art, the present invention provides a light source assembly for an alarm device, comprising: a base; a light source arranged on the base and configured to emit visible light; and a lens arranged on an emission path of the light source and configured to modulate the visible light emitted by the light source to conform to a preset light distribution curve.

In accordance with one aspect of the present invention, the light source comprises one or more LEDs.

In accordance with one aspect of the present invention, the lens is configured to modulate the visible light emitted by the light source to be visible within 180° on a vertical plane.

In accordance with one aspect of the present invention, the lens covers the light source, and the light source assembly further comprises a seal ring positioned between the lens and the base to seal the light source.

In accordance with one aspect of the present invention, a light source assembly further comprises a housing arranged on the base to encapsulate the light source and the lens, and a seal ring arranged between the housing and the base.

In accordance with one aspect of the present invention, the alarm device is a fire alarm device, and the LED has power equal to or greater than 20 W.

In accordance with one aspect of the present invention, the lens is configured to modulate the visible light emitted by the light source to meet the following conditions: by setting the light intensity right ahead the light source to be 100%, then the light intensity within the range of angle 5°-25° from the vertical axis of the base is not less than 90%, the light intensity within the range of angle 30°-45° from the vertical axis of the base is not less than 75%, the light intensity at angle 50° from the vertical axis of the base is not less than 55%, the light intensity at angle 55° from the vertical axis of the base is not less than 45%, the light intensity at angle 60° from the vertical axis of the base is not less than 40%, the light intensity within the range of angle 65°-70° from the vertical axis of the base is not less than 35%, the light intensity within the range of angle 75°-80° from the vertical axis of the base is not less than 30%, and the light intensity within the range of angle 80°-90° from the vertical axis of the base is not less than 25%.

The present invention further provides an alarm device, comprising: a sensor configured to be capable of detecting abnormal conditions; the light source assembly as described above; a drive circuit coupled to the sensor and the light source assembly and configured to drive the light source of the light source assembly to emit visible light when the sensor detects abnormal conditions.

In accordance with one aspect of the present invention, the alarm device is a fire alarm device, and the sensor is a smoke sensor and/or a temperature sensor.

In accordance with the one aspect of the present invention, the alarm device further comprises a sound alarm coupled to the drive circuit, and the drive circuit is configured to drive the sound alarm to deliver the alarm when the sensor detects abnormal conditions.

The present invention further provides an alarm device, comprising: an input module configured to receive an alert input signal; the light source assembly as described above, a drive circuit coupled to the input module and the light source assembly and configured to drive the light source of the light source assembly to emit visible light when the input module receives the alert input signal.

According to the light source assembly and the alarm device including the same in the embodiment of the present invention, the light emitted by the light source is modulated through the lens, so that the angle of emission of the light source assembly and the alarm device can be fully expanded. Especially when the light source assembly and the alarm device are applied to fire alarm devices, the alarm reception blind area can be effectively reduced, and the safety level is improved.

BRIEF DESCRIPTION OF THE DRAWINGS

The accompanying drawings are provided for the purpose of further understanding of the present invention, and constitute a part of the description and serve to explain the present invention along with the examples of the present invention, which should not limit the present invention. In the drawings.

DETAILED DESCRIPTION

Figure 1:
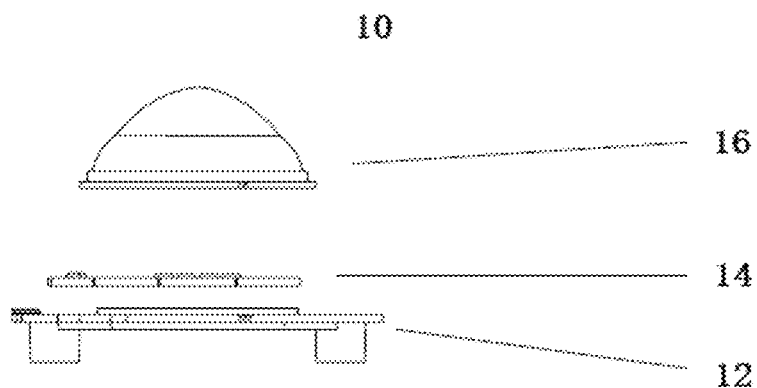
FIG. 1 is a schematic view of a light source assembly for an alarm device in accordance with the first example of the present invention.

The following exemplary embodiments will be described only in a brief manner. Just as those skilled in the art will recognize that changes in various ways to the examples described herein can be carried out without departing from the spirit or scope of the present invention. Therefore, the drawings and description are deemed substantively exemplary, instead of limitative.

In the description of the present invention, it need be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and only used for the purpose of facilitating description for the present invention and simplification of the description, instead of indicating or suggesting that the denoted devices or elements must be specifically oriented, or configured or operated in some specific orientation. Thus, such terms should not be construed to limit the present invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present invention, "more" means two or above, unless otherwise defined explicitly and specifically.

In the description of the present invention, it needs to be specified that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, it may cover the direction contact between the first and second features, also cover the contact via another feature therebetween, instead of the direct contact. Furthermore, if a first feature "above", "over" or "on the top of" a second one, it may cover that the first feature is right above or on the inclined top of the second feature, or just indicate that the first feature has a horizontal height higher than that of the second feature. If a first feature is "below", "under" or "on the bottom of" a second feature, it may cover that the first feature is right below and on the inclined bottom of the second feature, or just indicates that the first feature has a horizontal height lower than that of the second feature.

The disclosure below provides many different embodiments and examples for achieving different structures described herein. In order to simplify the disclosure herein, the following will give the description of the parts and arrangements embodied in specific examples. Surely, they are just for the exemplary purpose, not intended to limit the present invention. Besides, the present invention may repeat a reference number and/or reference letter in different examples, and such repeat is for the purpose of simplification and clarity, and itself denotes none of the relations among various embodiments and/or arrangements as discussed. In addition, the present invention provides examples for a variety of specific techniques and materials, but the common skilled persons in the art are aware of an application of other techniques and/or a use of other materials.

The following description, along with the accompanying drawings, sets forth the preferable examples herein. It should be understood that the preferable examples described herein are only for the purpose of illustrating and explaining, instead of limiting, the present invention.

FIG. 1 shows a light source assembly 10 for an alarm device in accordance with the first example of the present invention. As shown in FIG. 1, the light source assembly 10 comprises a base 12, a light source 14, and a lens 16. The base 12 is used to mount and support other parts of the light source assembly 10, on which a clip, a slot and other structure may be arranged. The light source 14 is placed on the base 12, and fixed thereon through the clip, the slot or other structures on the base 12. A drive circuit part, comprising for example a PCB and the corresponding circuits or chips, may be further arranged on the base 12 for driving the light source 14 to emit light. The base 12 may further comprise an external mechanical and/or circuit interface for mounting or connecting the light source assembly 10 onto other parts. For example, when applied to a fire alarm, the base 12 may be mounted on the fire alarm through the external interface.

The light source 14 may be a light source of any type, such as a flashtube. Specially preferably, the light source 14 may be an LED light source, such as a light source including one LED, or a high-power integrated light source comprising an array of a plurality of LEDs. When driven, the light source 14 can emit visible light, such as white light or colored light conveying strikingly warning meaning. As compared with a traditional light source, such as a flashtube, an LED light source has several advantages, such as light weight, small volume, low power consumption, long service life and strong controllability. In accordance with one example of the present invention, the LED has power equal to or greater than 20 W, for example, which may be constructed by adopting an array of a plurality of LED light sources, or a COB light source board.

Usually, the light source assembly 10 currently applied to an alarm device only includes a base and a light source mounted on the base. However, when the range of emission of the light source cannot sufficiently cover the site where it is located, there will be a safety hazard that part of the crowd cannot receive the alarm information in a timely manner. For this purpose, the present invention provides a lens 16 outside the light source 14 on an emission path of the light beam.

Through the lens 16, the visible light emitted by the light source 14 is modulated (such as by means of refraction) to conform to a predefined light distribution curve so as to, for example, at least allow the visible light emitted by the light source to be visible within 180° of the base. That is to say, by setting the front of the light emission of the light source to be 0°, there will be light beams visible within the range of 90° on both the left and right sides. By taking FIG. 1 as an example, suppose that the light source emits light in a upward direction, thereby that upward direction being the one at the angle of 0°, upon modulation by the lens 16, the warning light can be received on both the left (within the range of 90° on the left) and right (within the range of 90° on the right) sides. In case of danger (such as fire), this can greatly improve the striking degree of an alert signal and lower the potential safety hazard.

Figure 2:
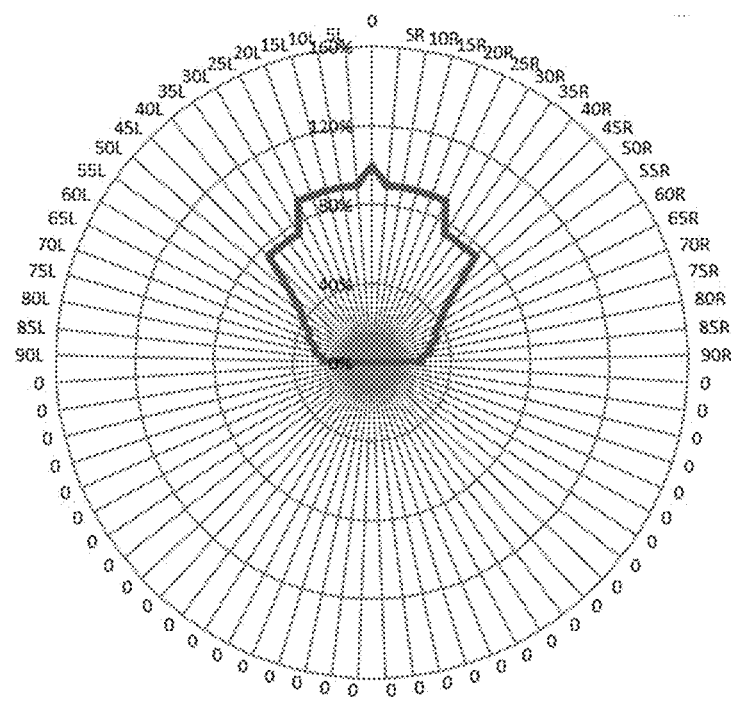
FIG. 2 illustrates a light distribution curve in accordance with one example of the present invention.
Figure 3:
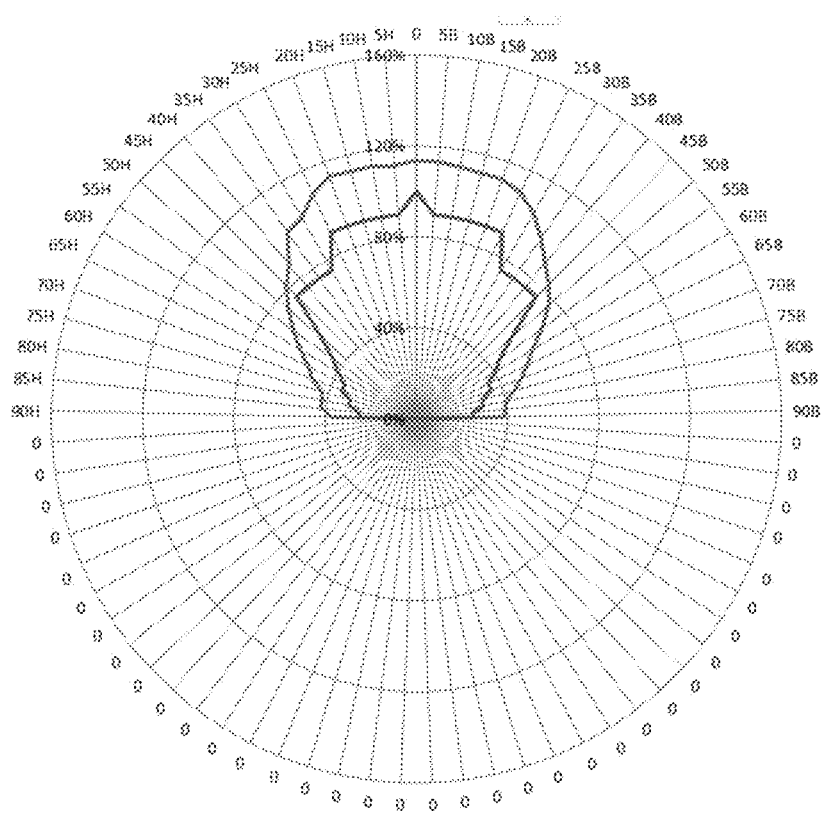
FIG. 3 shows a diagram of distribution of the modulated light intensity in accordance with one example of the present invention.

In accordance with one preferable example of the present invention, the lens 16 is configured to modulate the visible light emitted by the light source 14 to satisfy the following conditions: by setting the light intensity right ahead the light source to be 100%, then the light intensity within the range of angle 5°-25° from the vertical axis of the base is not less than 90%, the light intensity within the range of angle 30°-45° from the vertical axis of the base is not less than 75%, the light intensity at angle 50° from the vertical axis of the base is not less than 55%, the light intensity at angle 55° from the vertical axis of the base is not less than 45%, the light intensity at angle 60° from the vertical axis of the base is not less than 40%, the light intensity within the range of angle 65°-70° from the vertical axis of the base is not less than 35%, the light intensity within the range of angle 75°-80° from the vertical axis of the base is not less than 30%, and the light intensity within the range of angle 80°-90° from the vertical axis of the base is not less than 25%. For example, as shown in the example of a light distribution curve in FIG. 2, rather prominent light intensity still exists at about 90° on both the left and right sides of the light source. Please note that those skilled in the art can understand that the light distribution curve of FIG. 2 is merely a particular example of light distribution curves, and the protection scope of the present invention is not limited to this. In order to improve the security level, or to meet the particular requirements for alarm signals in different countries or regions, a corresponding light distribution curve may be provided and met. Moreover, in the present invention, "conform to a predefined light distribution curve" not only means that the distribution curve of the modulated light beam is identical or substantially identical with the predefined light distribution curve, but also refers to such scenario as that the predefined light distribution curve is regarded as the minimum requirement, and the intensity of the modulated light beam in various angles satisfies this minimum requirement, even if the profile of the curve of the modulated light beam is inconsistent with that of the predefined light distribution curve in some part. For example, as shown in FIG. 3, the profile of the internal light distribution curve therein is regarded as a light distribution curve of the minimum requirement, and the external curve is the intensity profile of the modulated light beam; as can be found, the intensity of the modulated light beam in each angle meets the light distribution curve of the minimum requirement. In the present invention, "modulate" means to change the intensity and/or direction of a beam light so as to make it satisfy certain requirements. Those skilled in the art can understand that, according to the requirements of relevant light distribution curves, they can design out the profiles of the incident surface and the emission surface of the lens 16 to meet the requirements of light distribution curves by adjusting the angle of emission after refraction according to the thickness and shape of the lens.

Figure 4A:
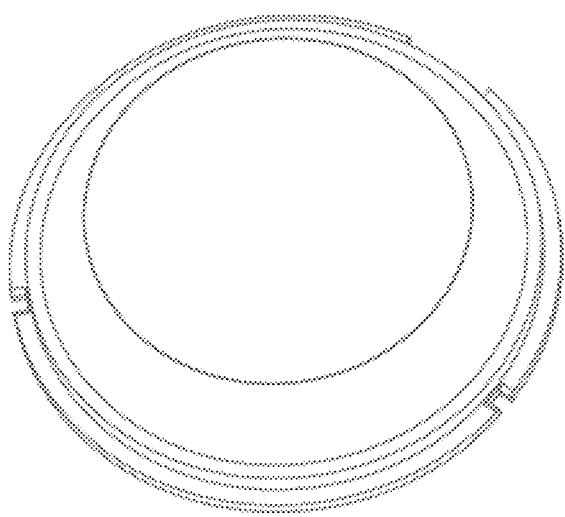
FIGS. 4A, 4B and 4C each illustrate a perspective view, a section view and a front view of a lens in accordance with one example of the present invention.
Figure 4B:
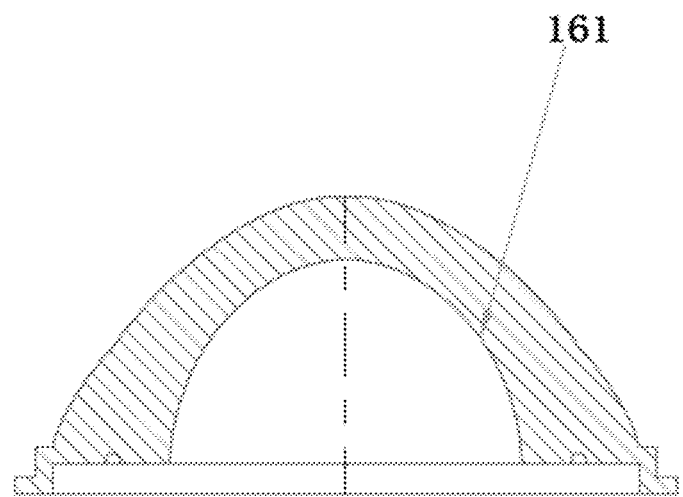
Figure 4C:
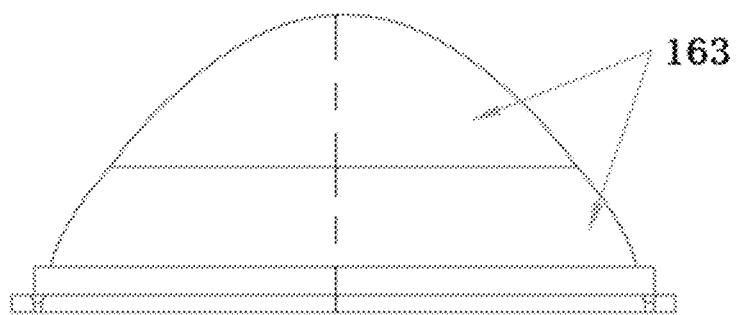

FIGS. 4A, 4B and 4C each illustrate a perspective view, a section view and a front view of the lens 16 in accordance with one example of the present invention. As shown in FIG. 4A, the lens 16, for example, is generally semicircular, comprising an inner surface that is an incident surface 161 of a light beam to receive the light beam emitted by the light source 14, such as an LED; and an outer surface that is an emission surface 163 of the light beam, through which the refracted light beam is emitted. The incident surface 161 is a traditional refractive curved surface, and by changing the curvature of the curved surface, the reception area of the emission surface is increased and the facula is enlarged. The emission surface 163 preferably includes multiple sections of free curves of special curvatures with points of inflection, thereby effectively controlling the angle of emission and the uniformity of facula. By adopting the structure principle of crescent refractive lens, both the incident surface and the emission surface are irregular free curves to achieve precise control of light. Multiple kinds of light sources can be adapted, and the angle can reach 120°-130° on both sides.

Figure 5:
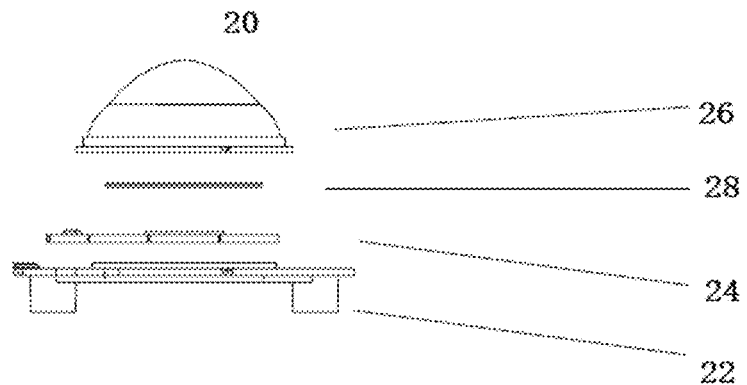
FIG. 5 is a schematic of a light source assembly for an alarm device in accordance with the second example of the present invention.

On many occasions, especially on the occasion of fire-fighting alarm, a variety of external environmental factors may have a significant impact on the light source. For example, on several occasions where hydrogen sulfide, sulfur dioxide and carbon dioxide exist, such harmful gas may cause the loss of LED light intensity to reach 20-30%. With regard to this problem, FIG. 5 shows a light source assembly of the second example in accordance with the present invention. As shown in FIG. 5, in addition to a base 22, a light source 24, and a lens 26, the light source assembly 20 further comprises a seal ring 28. In FIG. 5, the lens 26 is covered on the light source, and the seal ring is positioned between the lens and the base to seal the light source 24, isolate the external environmental factors and avoid the loss of light intensity. The seal ring 28, for example, may be made of silica gel, which is low in cost and capable of effectively preventing the corrosion on the LED from hydrogen sulfide, sulfur dioxide and carbon dioxide.

Alternatively, the light source assembly 24 may further comprise a housing (not shown) arranged on the base to encapsulate the light source and the lens, and a seal ring positioned between the housing and the base to seal the light source 24.

Figure 6:
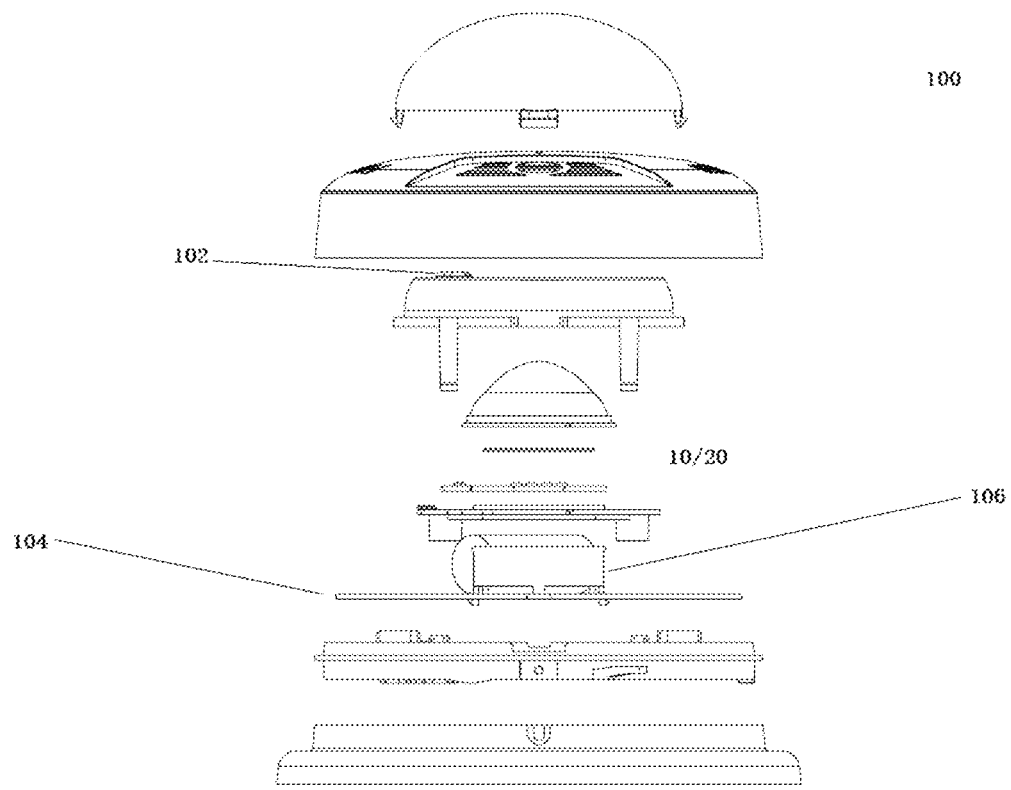
FIG. 6 is a schematic of an alarm device in accordance with one example of the present invention.

The present invention further involves an alarm device, for example, a fire alarm device. As shown in FIG. 6, an alarm device 100 comprises a sensor 102, a light source assembly 10/20, and a drive circuit 104. The sensor 102 is, for example, a smoke sensor, a temperature sensor, or other types of sensors capable of detecting abnormal conditions. The drive circuit 104 is coupled to the sensor 102 to receive an output signal from the sensor 102. Furthermore, the drive circuit 104 is coupled to the light source assembly 10/20 so as to drive the light source assembly 10/20 to emit light when receiving the output signal from the sensor 102 which indicates, for example, an abnormal temperature detected. After adjusted by the lens, the visible light emitted by the light source assembly 10/20 has a broader visible range or field of view.

In accordance with one preferable example of the present invention, the alarm device 100 further comprises a sound alarm 106. The sound alarm 106 is coupled to the drive circuit 104 so as to drive the sound alarm to sound the alarm when the sensor 102 detects abnormal conditions.

The alarm device may further include a manual alarm button that can directly trigger the drive circuit 104 and thus can drive the light source of the light source assembly to emit visible light even if the sensor 102 fails to detect a signal of abnormality The present invention further involves an alarm device, comprising: an input module configured to receive an alert input signal; the light source assembly as described above; a drive circuit coupled to the input module and the light source assembly, and configured to drive the light source of the light source assembly to emit visible light when the input module receives an alert input signal. In accordance with the example of the present invention, the alert input signal may be, for example, a signal from a water flow indicator, a pressure switch and a signal valve. When the input module receives an alert input signal, the drive circuit is then triggered to drive the light source of the light source assembly to emit visible light. Optionally, the input module also may be a manual triggering switch.

According to the light source assembly and the alarm device including the same in the embodiment of the present invention, the light emitted by the light source is modulated through the lens, so that the angle of emission of the light source assembly and the alarm device can be fully expanded. Especially when the light source assembly and the alarm device are applied to fire-fighting devices, the alarm reception blind area can be effectively reduced, and the safety level is improved.

Last but not least, the contents described above are just preferable examples of the present invention, and are not used to limit the present invention. Although the detailed description of the present invention has been provided with reference to the foregoing examples, those skilled in the art still may make modifications to the technical solutions recorded in various examples described above, or conduct equivalent replacement of part of technical features therein. Any modification, equivalent replacement, improvement, if only within the spirit and principles set out herein, should be covered by the protection scope of the present invention.

We claim:

1. A light source assembly for an alarm device, the light source assembly comprising:
   a base;
   a light source arranged on the base and configured to emit visible light;
   a lens arranged on an emission path of the light source and configured to modulate the visible light emitted by the light source to conform to a predefined light distribution curve;
   a housing arranged on the base to encapsulate the light source and the lens; and
   a seal ring arranged between the housing and the base.

2. The light source assembly according to claim 1, wherein the light source comprises one or more LEDs.

3. The light source assembly according to claim 1, wherein the lens is configured to modulate the visible light emitted by the light source to be visible within the range of 180° of the base.

4. The light source assembly according to claim 1, wherein the lens covers the light source, and the light source assembly further comprises a seal ring positioned between the lens and the base to seal the light source.

5. The light source assembly according to claim 2, wherein the alarm device is a fire alarm device, and the LED has power equal to or greater than 20 W.

6. The light source assembly according to claim 1, wherein the lens is configured to modulate the visible light emitted by the light source to meet the following conditions: by setting the light intensity right in front of the light source to be 100%, then the light intensity within the range of angle 5°-25° from the vertical axis of the base is not less than 90%, the light intensity within the range of angle 30°-45° from the vertical axis of the base is not less than 75%, the light intensity at angle 50° from the vertical axis of the base is not less than 55%, the light intensity at angle 55° from the vertical axis of the base is not less than 45%, the light intensity at angle 60° from the vertical axis of the base is not less than 40%, the light intensity within the range of angle 65°-70° from the vertical axis of the base is not less than 35%, the light intensity within the range of angle 75°-80° from the vertical axis of the base is not less than 30%, and the light intensity within the range of angle 80°-90° from the vertical axis of the base is not less than 25%.

7. An alarm device, comprising:
   a sensor configured to be capable of detecting abnormal conditions;
   a light source assembly, the light source assembly comprising:
      a base;
      a light source arranged on the base and configured to emit visible light;
      a lens arranged on an emission path of the light source and configured to modulate the visible light emitted by the light source to conform to a predefined light distribution curve;
      a housing arranged on the base to encapsulate the light source and the lens;
      a seal ring arranged between the housing and the base; and
   a drive circuit coupled to the sensor and the light source assembly and configured to drive the light source of the light source assembly to emit visible light when the sensor detects abnormal conditions.

8. The alarm device according to claim 7, wherein the alarm device is a fire alarm device, and the sensor is configured as a smoke sensor or a temperature sensor.

9. The alarm device according to claim 7, wherein the alarm device further comprises a sound alarm coupled to the drive circuit, and the drive circuit is configured to drive the sound alarm to deliver the alarm when the sensor detects abnormal conditions.

10. The alarm device according to claim 7, further comprising a manual alarm button that can directly trigger the drive circuit and drive the light source of the light source assembly to emit visible light.

11. The alarm device according to claim 7, wherein the light source comprises one or more LEDs, and the lens is configured to modulate the visible light emitted by the light source to be visible within the range of 180° of the base.

12. The alarm device according to claim 7, wherein the lens covers the light source, and the light source assembly further comprises a seal ring positioned between the lens and the base to seal the light source.

13. The alarm device according to claim 7, wherein the alarm device is a fire alarm device, and the LED has power equal to or greater than 20 W.

14. The alarm device assembly according to claim 7, wherein the lens is configured to modulate the visible light emitted by the light source to meet the following conditions: by setting the light intensity right in front of the light source to be 100%, then the light intensity within the range of angle 5°-25° from the vertical axis of the base is not less than 90%, the light intensity within the range of angle 30°-45° from the vertical axis of the base is not less than 75%, the light intensity at angle 50° from the vertical axis of the base is not less than 55%, the light intensity at angle 55° from the vertical axis of the base is not less than 45%, the light intensity at angle 60° from the vertical axis of the base is not less than 40%, the light intensity within the range of angle 65°-70° from the vertical axis of the base is not less than 35%, the light intensity within the range of angle 75°-80° from the vertical axis of the base is not less than 30%, and the light intensity within the range of angle 80°-90° from the vertical axis of the base is not less than 25%.

15. An alarm device, comprising:
- an input module configured to receive an alert input signal;
- a light source assembly, the light source assembly comprising:
  - a base;
  - a light source arranged on the base and configured to emit visible light;
  - a lens arranged on an emission path of the light source and configured to modulate the visible light emitted by the light source to conform to a predefined light distribution curve;
  - a housing arranged on the base to encapsulate the light source and the lens;
  - a seal ring arranged between the housing and the base; and
- a drive circuit coupled to the input module and the light source assembly and configured to drive the light source of the light source assembly to emit visible light when the input module receives the alert input signal.

16. The alarm device according to claim 15, wherein the light source comprises one or more LEDs, and the lens is configured to modulate the visible light emitted by the light source to be visible within the range of 180° of the base.

17. The alarm device according to claim 15, wherein the lens covers the light source, and the light source assembly further comprises a seal ring positioned between the lens and the base to seal the light source.

18. The alarm device according to claim 15, wherein the alarm device is a fire alarm device, and the LED has power equal to or greater than 20 W.

19. The alarm device according to claim 15, wherein the lens is configured to modulate the visible light emitted by the light source to meet the following conditions: by setting the light intensity right in front of the light source to be 100%, then the light intensity within the range of angle 5°-25° from the vertical axis of the base is not less than 90%, the light intensity within the range of angle 30°-45° from the vertical axis of the base is not less than 75%, the light intensity at angle 50° from the vertical axis of the base is not less than 55%, the light intensity at angle 55° from the vertical axis of the base is not less than 45%, the light intensity at angle 60° from the vertical axis of the base is not less than 40%, the light intensity within the range of angle 65°-70° from the vertical axis of the base is not less than 35%, the light intensity within the range of angle 75°-80° from the vertical axis of the base is not less than 30%, and the light intensity within the range of angle 80°-90° from the vertical axis of the base is not less than 25%.

\* \* \* \* \*